(12) United States Patent
Gordon et al.

(10) Patent No.: US 11,772,577 B2
(45) Date of Patent: Oct. 3, 2023

(54) SERVICEABLE SHOE-CLIP FASTENER FOR VEHICLE TRIM ATTACHMENT

(71) Applicant: GM GLOBAL TECHNOLOGY OPERATIONS LLC, Detroit, MI (US)

(72) Inventors: Dresdan Gordon, Ortonville, MI (US); Riley J. Lokar, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 284 days.

(21) Appl. No.: 17/063,916

(22) Filed: Oct. 6, 2020

(65) Prior Publication Data

US 2022/0105881 A1  Apr. 7, 2022

(51) Int. Cl.
*B60R 13/02* (2006.01)
*F16B 5/06* (2006.01)

(52) U.S. Cl.
CPC ........ *B60R 13/0206* (2013.01); *F16B 5/0642* (2013.01)

(58) Field of Classification Search
CPC ... B60R 13/0206; B60R 13/02; F16B 5/0642; F16B 5/0657; F16B 5/0607; F16B 21/065; F16B 2/22
See application file for complete search history.

(56) References Cited

U.S. PATENT DOCUMENTS

| | | | |
|---|---|---|---|
| 4,712,341 A * | 12/1987 | Harris, Jr. | B60J 1/005 411/908 |
| 8,496,420 B2 | 7/2013 | Aoki et al. | |
| 9,049,905 B2 | 6/2015 | Perez | |
| 9,963,087 B2 | 5/2018 | Leverger et al. | |
| 10,519,992 B2 | 12/2019 | Santillan Gutierrez et al. | |
| 10,578,138 B2 | 3/2020 | Izumi et al. | |
| 2005/0054229 A1* | 3/2005 | Tsuya | F16B 5/0642 439/280 |
| 2009/0263210 A1 | 10/2009 | Loewe et al. | |
| 2012/0227219 A1* | 9/2012 | Kabeya | B60R 11/0217 24/453 |
| 2012/0274094 A1* | 11/2012 | Mazur | F16B 5/0635 296/146.7 |
| 2013/0199001 A1* | 8/2013 | Jagoda | F16B 5/0657 24/453 |

(Continued)

FOREIGN PATENT DOCUMENTS

| | | |
|---|---|---|
| CN | 101561006 A | 10/2009 |
| CN | 101900155 A | 12/2010 |

(Continued)

OTHER PUBLICATIONS

Chinese Application No. 202110468763.9 filed Apr. 28, 2021; Chinese Office Action with English Translation dated Apr. 15, 2023; 12 pages.

*Primary Examiner* — Robert Sandy
*Assistant Examiner* — Rowland Do
(74) *Attorney, Agent, or Firm* — CANTOR COLBURN LLP

(57) ABSTRACT

A shoe-clip fastener for securing components in a vehicle includes a stop member having a wall portion and a slot defined in the wall portion and an insertion element coupled to the stop member. The insertion element includes a base member and a clip member cantilevered from the base member. The clip member includes an actuator section that projects proudly of the slot.

14 Claims, 6 Drawing Sheets

(56) References Cited

U.S. PATENT DOCUMENTS

2016/0288730 A1    10/2016  Lee et al.
2018/0208127 A1*   7/2018   Harvey ............... B60R 13/0206

FOREIGN PATENT DOCUMENTS

| CN | 102834625 A  | 12/2012 |
| CN | 104254695 A  | 12/2014 |
| CN | 104350292 A  | 2/2015  |
| CN | 104564933 A  | 4/2015  |
| CN | 205674961 U  | 11/2016 |
| CN | 108454531 A  | 8/2018  |
| CN | 209761931 U  | 12/2019 |
| CN | 111550479 A  | 8/2020  |
| EP | 3696428 A1   | 8/2020  |

\* cited by examiner

SERVICEABLE SHOE-CLIP FASTENER FOR VEHICLE TRIM ATTACHMENT

INTRODUCTION

The subject disclosure relates to the art of fasteners and, more particularly, to a serviceable shoe-clip fastener for vehicle trim attachment.

Vehicles often include various trim pieces and panel covers that are secured to surfaces to cover openings, fasteners, add aesthetics and the like. Trim pieces are secured to an attachment surface by, for example, a panel clip. The panel clip includes a head and pin that supports one or more barbs. When installed, the barbs grip the attachment surface to secure the trim piece in place. Other panel clips may be formed from, for example, spring steel. Such clips may be placed over a post and inserted into an opening. The clips include barbs that engage with the attachment surface.

In general, removing a panel clip requires access to both sides of the attachment surface or the use of a tool. Access to both sides of the attachment surface allows a person to release the barbs and remove the clip. The tool is used to pry up on the cap or trim piece until the panel clip releases. In some cases, the tool may be used to engage and depress the barb. Unfortunately, the tool may, on occasion, break the panel clip, mar the trim piece, or cause damage in some other manner. Accordingly, it would be desirable to release a panel clip without the use of a tool or the need to access both sides of an attachment surface.

SUMMARY

In one exemplary embodiment, a shoe-clip fastener for securing components in a vehicle includes a stop member having a wall portion and a slot defined in the wall portion and an insertion element coupled to the stop member. The insertion element includes a base member and a clip member cantilevered from the base member. The clip member includes an actuator section that projects proudly of the slot.

In addition to one or more of the features described herein the insertion element is integrally formed with the stop member.

In addition to one or more of the features described herein the stop member includes a first, substantially planar surface and a second, curvilinear surface arranged opposite the first surface.

In addition to one or more of the features described herein the clip member includes a first portion extending from the base member, a second section extending from the first portion toward the base member, and a third section extending from the second section away from the base member, the third section defining the actuator section.

In addition to one or more of the features described herein the clip member is cantilevered from the base member.

In another exemplary embodiment, a vehicle includes a chassis and a body supported by the chassis. The body includes a first panel having a belt loop provided with an opening and a second panel receptive of the belt loop. The second panel being secured to the first panel by a shoe-clip fastener including a stop member including a wall portion and a slot defined in the wall portion and an insertion element coupled to the stop member. The insertion element extends through the belt loop and including a base member and a clip member cantilevered from the base member. The clip member engages the belt loop and includes an actuator section that projects proudly of the slot.

In addition to one or more of the features described herein the insertion element is integrally formed with the stop member.

In addition to one or more of the features described herein the stop member includes a first, substantially planar surface and a second, curvilinear surface arranged opposite the first surface.

In addition to one or more of the features described herein the clip member includes a first portion extending from the base member, a second section extending from the first portion toward the base member, and a third section extending from the second section away from the base member, the third section defining the actuator section.

In addition to one or more of the features described herein the clip member is cantilevered from the base member.

In addition to one or more of the features described herein the first panel defines a door panel and the second panel defines a decorative trim component mounted to the door panel.

In addition to one or more of the features described herein the belt loop includes a first side and an opposing second side, the shoe-clip being insertable through the first side and removable without accessing the second side.

In yet another exemplary embodiment, a method of securing and releasing a first vehicle component relative to a second vehicle component includes inserting a belt loop provided on a first vehicle component through a passage provided in a second vehicle component, guiding a shoe-clip fastener through an opening in the belt loop, and engaging a clip member on the shoe-clip fastener with the belt loop to secure the second vehicle component to the first vehicle component.

In addition to one or more of the features described herein guiding the shoe-clip fastener through the opening includes passing the shoe-clip fastener through the opening from a first side of the belt loop.

In addition to one or more of the features described herein the shoe-clip fastener is released from the first side of the belt loop without accessing a second opposing side of the belt loop.

In addition to one or more of the features described herein releasing the shoe-clip fastener includes deflecting the clip member away from the belt loop.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
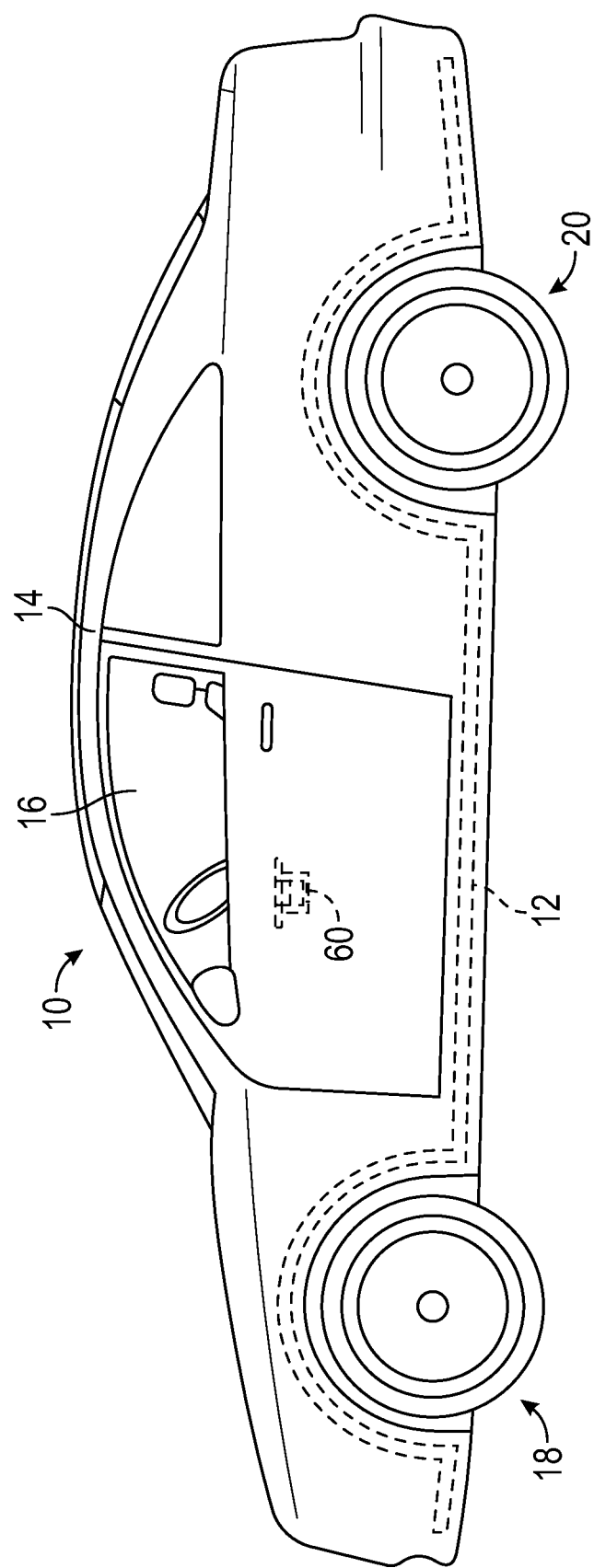
FIG. 1 is a side view of a vehicle including a serviceable shoe-clip fastener, in accordance with an exemplary aspect.

The following description is merely exemplary in nature and is not intended to limit the present disclosure, its application or uses. It should be understood that throughout the drawings, corresponding reference numerals indicate like or corresponding parts and features.

Figure 2:
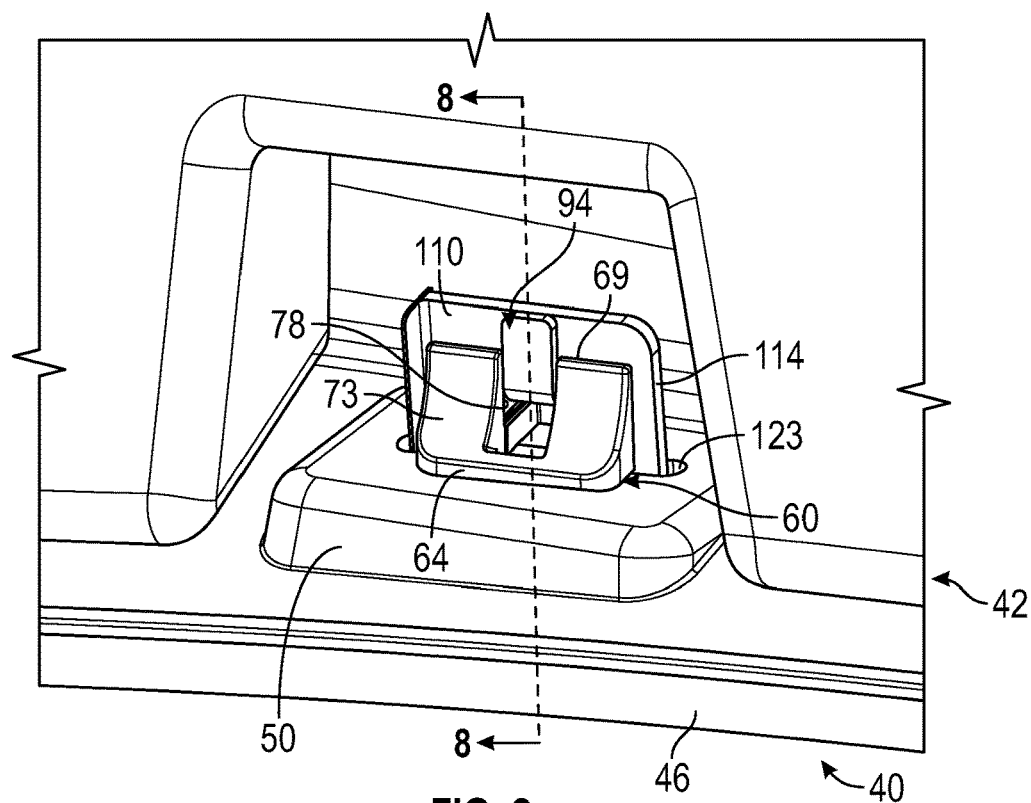
FIG. 2 depicts an inside view of a vehicle door showing the serviceable shoe-clip securing a decorative trim component to a door panel, in accordance with an exemplary embodiment.

A vehicle, in accordance with an exemplary embodiment, is indicated generally at 10 in FIGS. 1 and 2. Vehicle 10 includes a chassis 12 that supports a body 14 having a passenger compartment 16. Chassis 12 also supports a pair of front wheels 18 and a pair of rear wheels 20. As will be detailed herein, body 14 includes a first panel 40 and a second panel 42. First panel 40 may take the form of a door panel 46 and second panel 42 may take the form of a decorative trim component 50. As will be detailed more fully herein, decorative trim component 50 is secured to door panel 46 by a serviceable shoe-clip fastener 60

Figure 3:
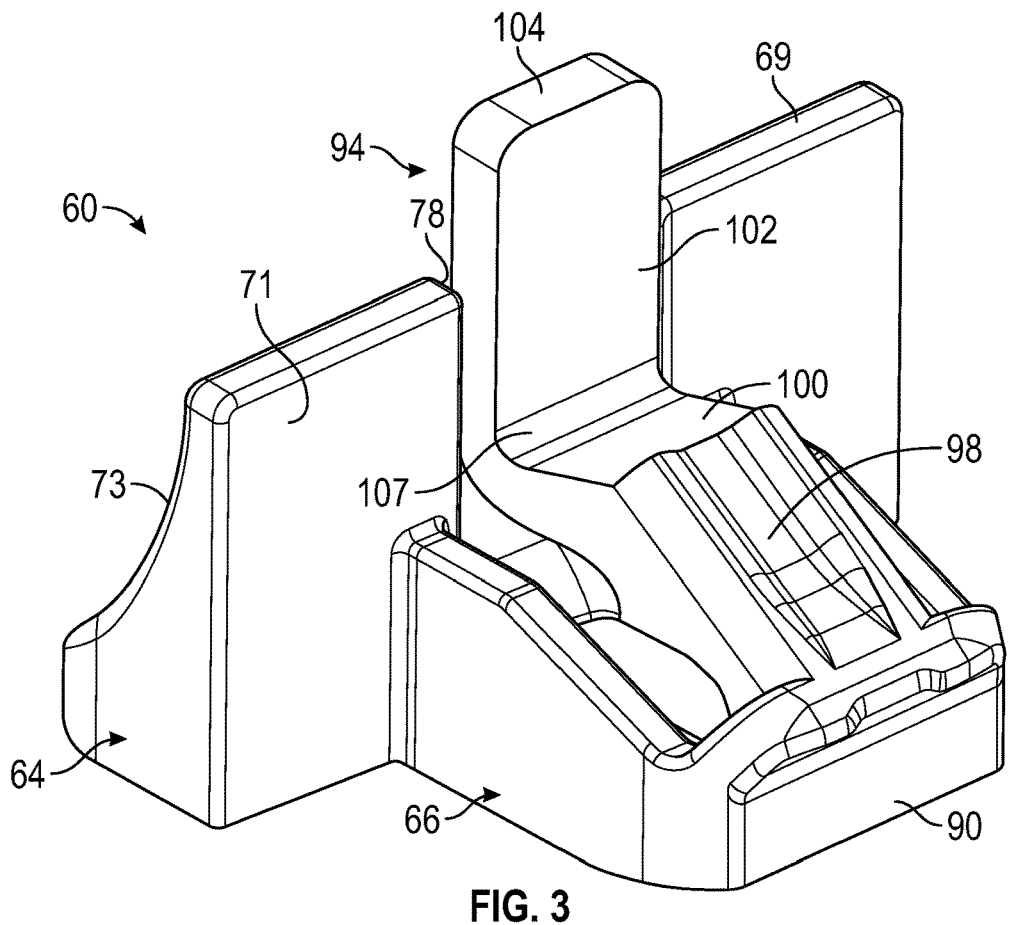
FIG. 3 depicts the shoe-clip fastener, in accordance with an exemplary aspect.
Figure 8:
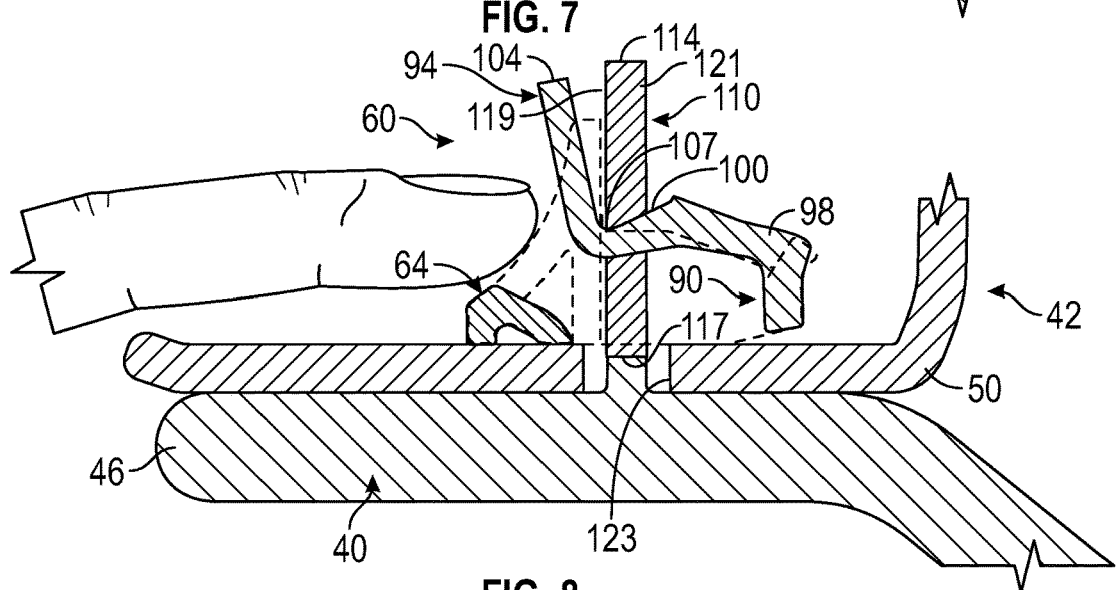
FIG. 8 depicts a cross-sectional side view of the shoe-clip in FIG. 7 being seated into the belt loop, in accordance with an exemplary aspect.

As shown in FIG. 3, serviceable shoe-clip fastener 60 includes a stop member 64 that limits insertion depth and an insertion element 66 that secures to, for example, first panel 40. Stop member 64 includes a wall portion 69 having a first surface 71 and an opposing second surface 73. First surface 71 is substantially planar while second surface 73 is curvilinear. Second surface 73 is shaped so as to accommodate, for example, a fingertip that may be used to install serviceable shoe-clip 60 (FIG. 8). A slot 78 extends through first and second surfaces 71 and 73. Slot 78 is located centrally on wall portion 69 and includes an exposed end portion (not separately labeled).

Insertion element 66 includes a base member 90 that supports a flexible clip member 94. In an embodiment, clip member 94 is cantilevered from base member 90 and includes a first section 98 that extends from base member 90, a second section 100 that extends from first section 98, and a third section 102 that extends from second section 100 and defines an actuator section 104 that projects proudly of slot 78. First section 98 extends from base member 90 toward wall portion 69 at a first angle. Second section 100 extends from first section 98 downwardly, and third section 102 extends upwardly from second section 100. A detent or notch 107 is defined at an interface of second section 100 and third section 102. As will be detailed herein, detent 107 selectively engages with first panel 40 to secure second panel 42.

Figure 4:
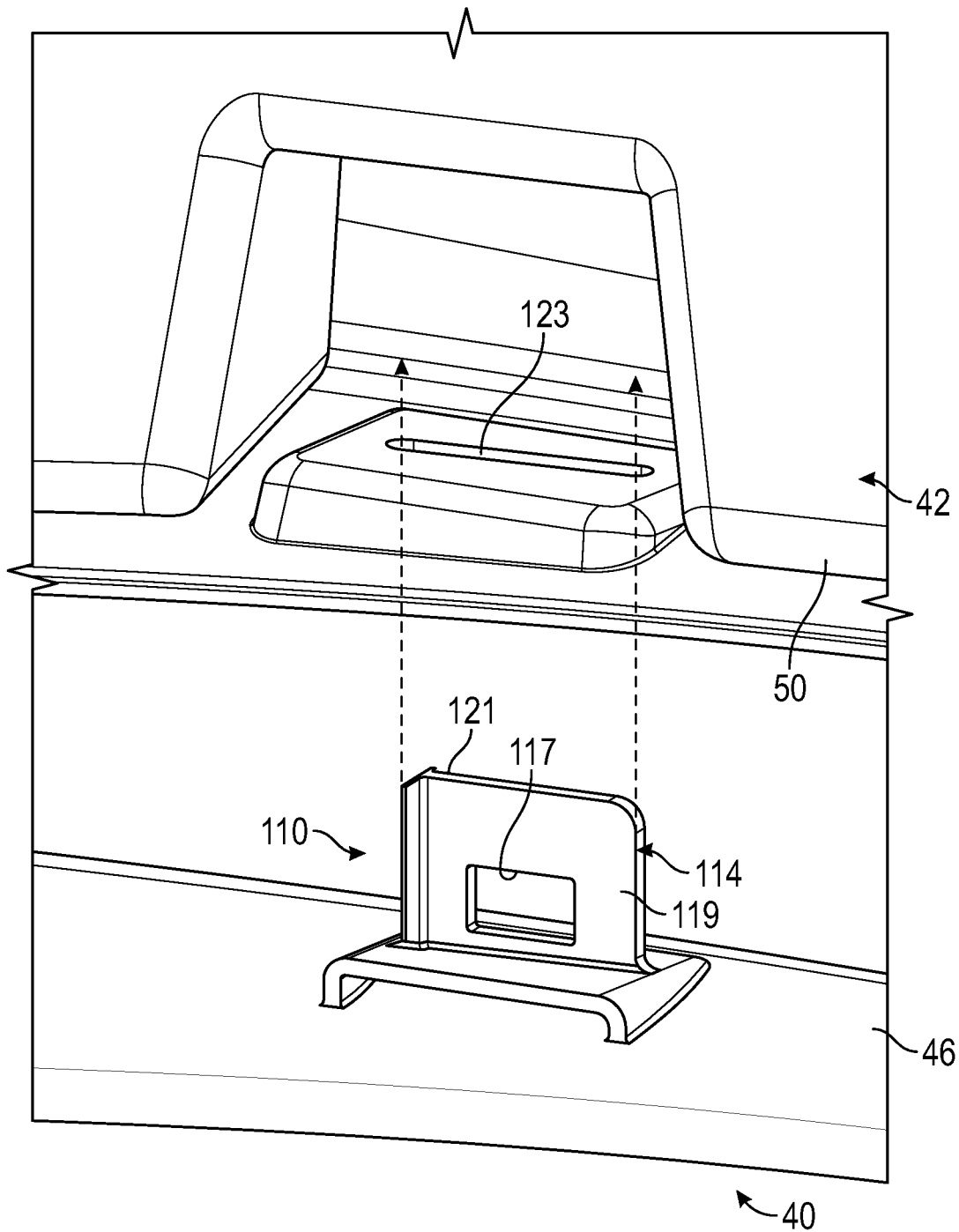
FIG. 4 depicts the trim piece receiving a belt-loop on the panel, in accordance with an exemplary aspect.
Figure 5:
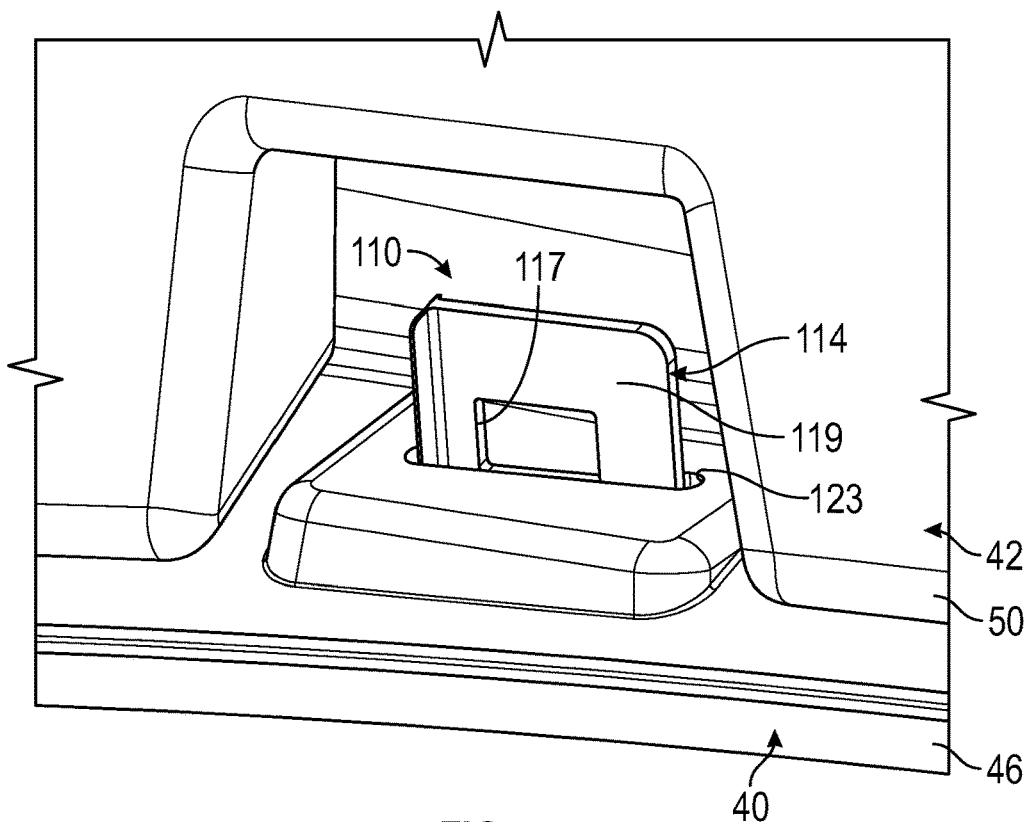
FIG. 5 depicts the belt-loop extending thought an opening in the trim piece, in accordance with an exemplary aspect.
Figure 6:
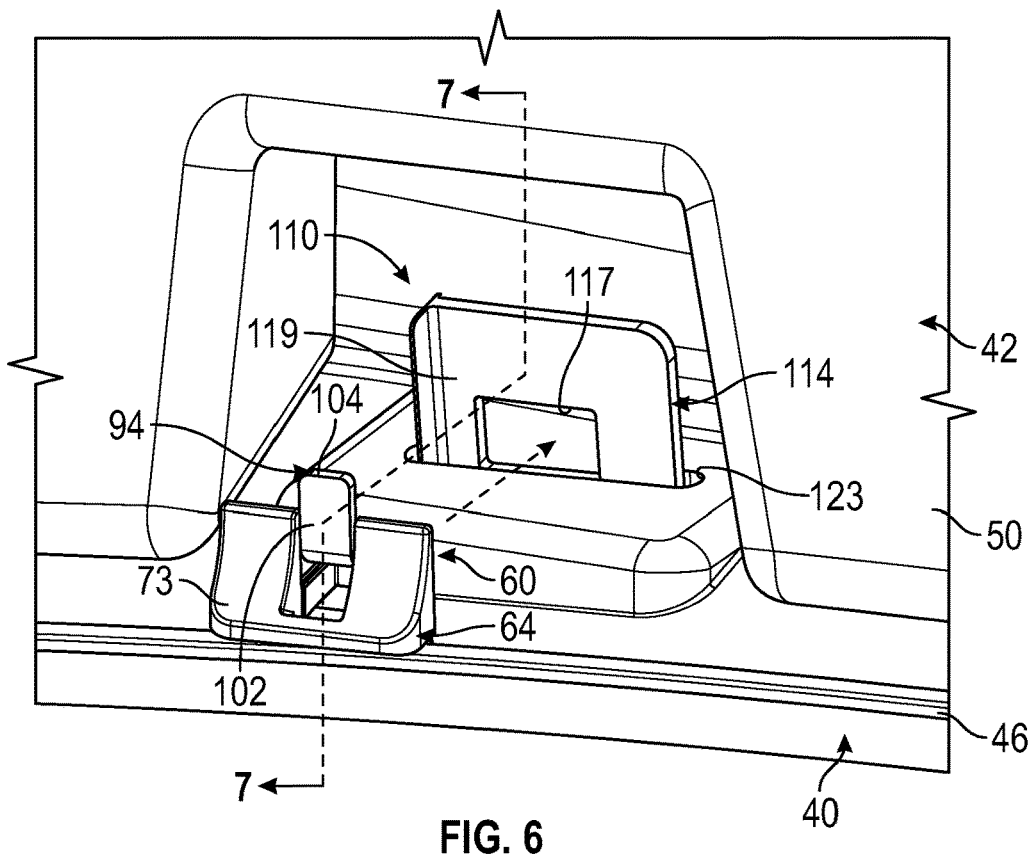
FIG. 6 depicts the shoe-clip being installed into the belt-loop, in accordance with an exemplary aspect.
Figure 7:
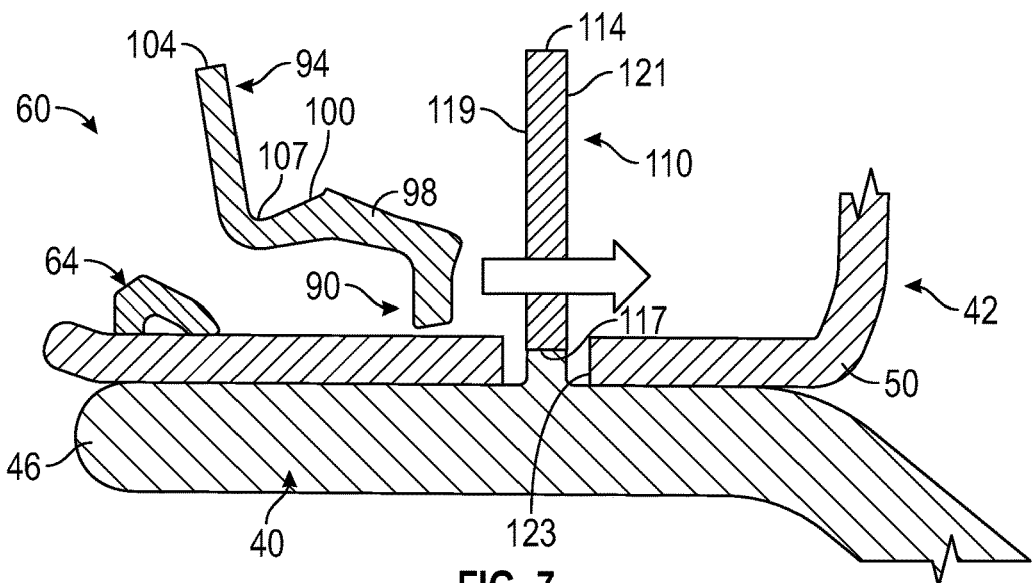
FIG. 7 depicts a cross-sectional side view of the shoe-clip of FIG. 6 taken along the line 7-7 moving into the belt-loop, in accordance with an exemplary aspect.
Figure 9:
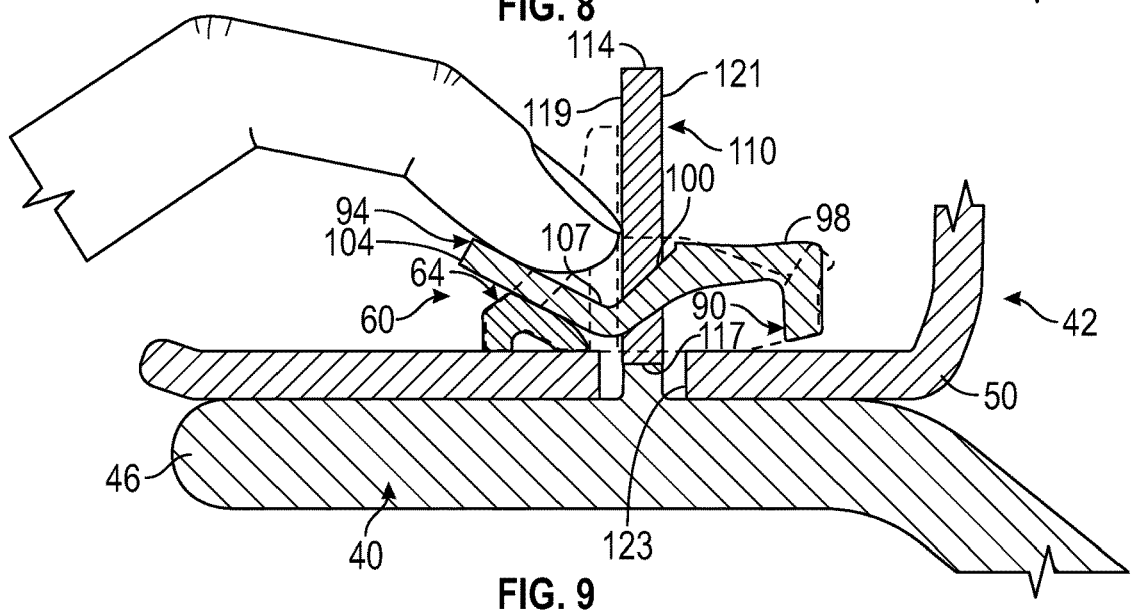
FIG. 9 depicts the cross-sectional side view of the shoe-clip of FIG. 2 taken along the line 9-9 engaged with the belt-loop, in accordance with an exemplary aspect.

With reference to FIG. 4, first panel 40 includes a belt loop type projection 110 having an outer wall 114 defining an opening 117. Outer wall 114 includes a first side 119 and an opposing second side 121. Second panel 42 includes a passage 123 that is receptive of belt loop 110. In an exemplary aspect, second panel 42 is positioned on first panel 40 such that belt loop 110 passes through passage 123 with first side 119 being exposed and accessible as shown in FIG. 5. At this point, serviceable shoe-clip fastener 60 is passed into opening 117 as shown in FIG. 6-8 by for example pushing on curvilinear surface 73 with a finger. As serviceable shoe-clip fastener 60 enters into opening 117, clip member 94 deflects. When fully seated, outer wall 114 settles into detent 107 with actuator section 104 (FIG. 8) being accessible from first side 119 of belt loop 110 as shown in FIG. 9. At this point, second panel 42 is secured to first panel 40.

Figure 10:
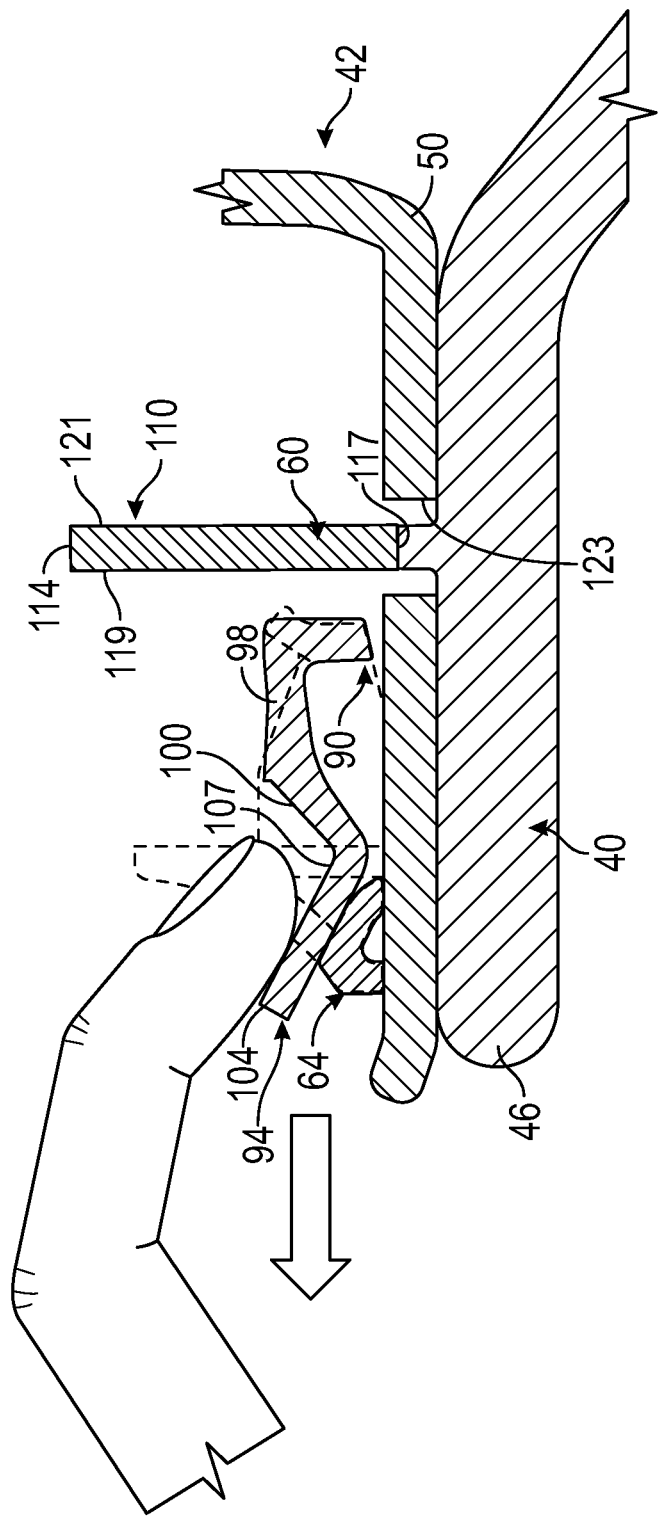
FIG. 10 depicts the cross-sectional side view of the shoe-clip element of FIG. 9 being withdrawn from the belt loop, in accordance with an exemplar aspect.

In accordance with an exemplary embodiment, serviceable shoe-clip fastener 60 may be readily removed without the need to have access to second, opposing side 121 of belt loop 110. As shown in FIG. 10, serviceable shoe-clip fastener 60 may be removed from belt loop 110 by depressing actuator section 104 of clip member 94. Clip member 94 may be deflected such that outer wall 114 clears detent 107. At this point, serviceable shoe-clip fastener 60 may be readily and easily removed without the need for tools or to further disassemble first panel 40 or other vehicle components.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A shoe-clip fastener for securing components in a vehicle, the shoe-clip fastener comprising:
 a stop member including a wall portion having a first surface, a second surface that is opposite the first surface and a slot formed in the wall portion, the slot having a discontinuity defining an exposed end portion in the wall portion; and
 an insertion element coupled to the stop member, the insertion element including a base member extending substantially perpendicularly outwardly from the first surface of wall portion and a clip member cantilevered from the base member, the clip member including an actuator section that projects through the exposed end portion of the slot and beyond the wall portion.

2. The shoe-clip fastener according to claim 1, wherein the insertion element is integrally formed with the stop member.

3. The shoe-clip fastener according to claim 1, wherein the first surface of the wall portion is a substantially planar surface and the second surface of the wall portion is a curvilinear surface arranged opposite the first surface.

4. The shoe-clip fastener according to claim 1, wherein the clip member includes a first section extending from the base member, a second section extending from the first section toward the base member, and a third section extending from the second section away from the base member, the third section defining the actuator section.

5. The shoe-clip fastener according to claim 1, wherein the clip member is cantilevered from the base member.

6. The shoe-clip fastener according to claim 1, wherein the actuator section and the first surface of the wall portion are substantially parallel.

7. A vehicle comprising:
a chassis;
a body supported by the chassis, the body including a first panel having a belt loop provided with an opening and a second panel receptive of the belt loop, the second panel being secured to the first panel by a shoe-clip fastener comprising:
a stop member including a wall portion having a first surface, a second surface that is opposite the first surface and a slot formed in the wall portion, the slot having a discontinuity defining an exposed end portion in the wall portion; and
an insertion element coupled to the stop member, the insertion element including a base member extending substantially perpendicularly outwardly from the first surface of the wall portion and a clip member cantilevered from the base member, the clip member including an actuator section that projects through the exposed end portion of the slot and beyond the wall portion.

8. The vehicle according to claim 7, wherein the insertion element is integrally formed with the stop member.

9. The vehicle according to claim 7, wherein the first surface of the wall portion is a substantially planar surface and the second surface of the wall portion is a curvilinear surface arranged opposite the first surface.

10. The vehicle according to claim 7, wherein the clip member includes a first section extending from the base member, a second section extending from the first section toward the base member, and a third section extending from the second section away from the base member, the third section defining the actuator section.

11. The vehicle according to claim 7, wherein the clip member is cantilevered from the base member.

12. The vehicle according to claim 7, wherein the first panel defines a door panel and the second panel defines a decorative trim component mounted to the door panel.

13. The vehicle according to claim 7, wherein the belt loop includes a first side and an opposing second side, the shoe-clip fastener being insertable through the first side and removable without accessing the second side.

14. The vehicle according to claim 9, wherein the actuator section and the first surface of the wall portion are substantially parallel.

* * * * *